United States Patent [19]

Kobayashi

[11] Patent Number: 4,519,012

[45] Date of Patent: May 21, 1985

[54] LIQUID QUANTITY SENSOR OF CAPACITOR TYPE AND METHOD OF PRODUCING SAME

[75] Inventor: Hiroshi Kobayashi, Yokohama, Japan

[73] Assignee: Nissan Motor Co., Ltd., Yokohama, Japan

[21] Appl. No.: 521,171

[22] Filed: Aug. 8, 1983

[30] Foreign Application Priority Data

Sep. 10, 1982 [JP] Japan .................. 57-157861

[51] Int. Cl.³ .................. H01G 5/28; G01F 23/00
[52] U.S. Cl. .................. 361/284; 73/304 C
[58] Field of Search .................. 361/284; 73/304 C

[56] References Cited

U.S. PATENT DOCUMENTS

| 2,426,252 | 8/1947 | Thomson | 361/284 X |
| 3,335,344 | 8/1967 | Kling | 361/284 |

FOREIGN PATENT DOCUMENTS

| 113321 | 7/1982 | Japan | 73/304 C |
| 513771 | 10/1939 | United Kingdom . | |
| 792484 | 3/1958 | United Kingdom . | |
| 1359799 | 7/1974 | United Kingdom | 73/304 C |
| 2089516A | 6/1982 | United Kingdom . | |

OTHER PUBLICATIONS

Ein Brennstoffmengen-Anzeigegerät mit kapazitivem Geber für Flugzeugtanks in Electronics, 1957, No. 12, pp. 360-363.

Primary Examiner—Donald A. Griffin
Attorney, Agent, or Firm—Lowe, King, Price & Becker

[57] ABSTRACT

A liquid quantity sensor has at least one pair of electrode plates which are vertically disposed in a vessel, e.g. an automotive fuel tank, in a spaced and parallel arrangement so as to form a capacitor. To enhance accuracy and uniformity of the distance between the two electrode plates, a plurality of annular, synthetic resin insulating spacers having a thickness that corresponds with the aforementioned distance are interposed between the two electrode plates in such an arrangement that the distance between adjacent pairs of spacers is between 50 mm and 80 mm. The two electrode plates are fastened to each other at each location where one of the spacers is present by tightening a fastening means such as a rivet inserted through holes formed in the two electrode plates such that each spacer is subjected to a compressive load between 40 and 100 kgf.

23 Claims, 3 Drawing Figures

LIQUID QUANTITY SENSOR OF CAPACITOR TYPE AND METHOD OF PRODUCING SAME

BACKGROUND OF THE INVENTION

This invention relates to a liquid quantity sensor of the type of detecting the quantity of liquid in a vessel by responding to a variation in the capacitance between two metal plates vertically disposed in the vessel and a method of producing the same. For example, the vessel is a fuel tank in a vehicle.

It is possible to detect the quantity of a liquid in a vessel by fixedly and vertically disposing two adequately spaced flat and parallel, or cylindrical and concentric electrode plates in the vessel and measuring the capacitance between these two electrode plates. This method is based on the fact that most liquid materials have dielectric constants considerably different from the dielectric constant of air. As the liquid level in the vessel rises or lowers, the submerged fraction of the effective surface area of the capacitor formed by the two electrode plates increases or decreases with a corresponding change in the value of capacitance between the two electrode plates.

When a vessel provided with a liquid quantity sensor of the capacitor type is stationary there is little problem in accurately detecting the quantity of a liquid contained in the vessel. However, the situation is different when the vessel is installed on a vehicle such as an automobile as a fuel tank. In this case difficulties arise in accurately detecting the quantity of fuel in the tank while the vehicle runs because the fuel tank becomes inclined to various degrees, causing the fuel to sway and undulate. To resolve such difficulties it is usual to use a liquid quantity sensor having plural parallel connected sets of capacitor electrode plates which are disposed at suitably selected locations in the fuel tank. Irrespective of the configuration and arrangement of the electrode plates, it is very important for accurate detection of the liquid quantity to keep an accurate and uniform distance between each pair of electrode plates. In this regard, British patent application publication No. 2,089,516A shows a liquid quantity sensor of the capacitor type in which a plurality of insulating spacers all of which have an accurately determined length or thickness are inserted between each pair of electrode plates.

However, known liquid quantity sensors of the capacitor type are not yet fully satisfactory in the accuracy of measurements when used, for example, in fuel tanks of automobiles.

SUMMARY OF THE INVENTION

It is an object of the present invention to provide an improved liquid quantity sensor of the above described capacitor type, which sensor can very accurately detect the quantity of a liquid in a vessel even when the vessel is inclined to various degrees or the liquid itself makes swaying and undulating movements.

It is another object of the present invention to provide an improved method of producing a liquid quantity sensor of the capacitor type, which method enables the produced sensor to derive very highly accurate measurements.

A liquid quantity sensor according to the invention comprises at least one electrode plate assembly set, which comprises a first electrode plate substantially vertically disposed in a vessel, a second electrode plate arranged parallel to and spaced from the first electrode plate such that the first and second electrode plates form a capacitor, a plurality of electrically insulating material spacers which are tightly interposed between the first and second electrode plates in such an arrangement that the distance between a pair of adjacent spacers is not greater than 80 mm, each of the spacers having a thickness corresponding with a predetermined horizontal distance between the first and second electrode plates, and a plurality of fastening means for fastening the second electrode plate to the first electrode plate. The fastening means are inserted through holes formed in the first and second electrode plates at each location where one of said spacers is interposed between the first and second electrode plates such that each of the spacers is subjected to a compressive load not smaller than 40 kgf.

In another aspect, the present invention provides a method of producing a liquid quantity sensor of the above described type. This method comprises the steps of interposing a plurality of spacers of an electrically insulating material between first and second electrode plates arranged parallel to each other in such an arrangement that the distance between a pair of adjacent spacers is not greater than 80 mm, each of the spacers having a thickness corresponding with a predetermined horizontal distance between the first and second electrode plates, and fastening the second electrode plate to the first electrode plate at each location where one of the spacers is interposed between the first and second electrode plates by inserting a fastening means through holes formed in the first and second electrode plates and tightening the fastening means such that each of the spacers is subjected to a compressive load not smaller than 40 kgf.

The applicant recognized that the uniformity of the horizontal distance between the two electrode plates is significantly affected by the distance between two adjacent spacers and by the clamping force of fasteners of the two electrode plates. The clamping force is represented by a compression load on each of the spacers interposed between the two electrode plates. The applicant has discovered and confirmed that the uniformity of the distance between the two electrode plates and, hence, the accuracy of the capacitance between the two electrodes can be greatly enhanced by the fastening the two electrode plates so as to apply a compressive load of at least 40 kgf to each spacer, while the spacers are positioned such that the distance between two adjacent spacers does not exceed 80 mm.

Therefore, in the industrial production of this liquid quantity sensor it is possible to remarkably decrease the dispersion of the capacitance among a large number of products. When the shape and arrangement of each pair of electrode plates in a liquid container are designed appropriately, a liquid quantity sensor according to the invention can detect the quantity of liquid in the container with high accuracy even though the liquid undergoes swaying and undulating movements.

DESCRIPTION OF THE PREFERRED EMBODIMENTS

Figure 1:
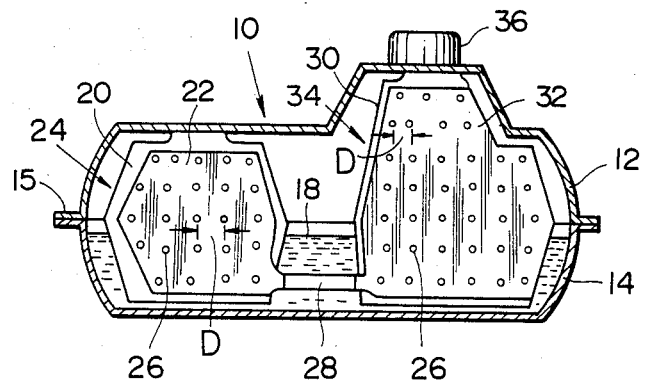
FIG. 1 is a vertical sectional view of an automobile fuel tank provided with a liquid quantity sensor embodying the present invention.

FIG. 1 is a diagram of an automobile fuel tank 10 which is provided with a liquid quantity sensor according to the invention. Fundamentally this fuel tank 10 is made up of an upper shell 12 and a lower shell 14, which are formed of sheet metal and welded to each other along their side peripheral flanges 15. Two baffleplates 20 and 30 are disposed in the fuel tank 10 to suppress violent and noise-producing movement of liquid fuel 18 contained in the tank and great undulations of the fuel level during running of the car. Each of these baffleplates 20 and 30 is a metal plate disposed vertically and fixed to the inner surface of the upper shell 12 by spot welding, for instance.

A metal electrode plate 22 is arranged opposite to and parallel to the baffleplate 20 with a short and predetermined horizontal distance therebetween for the purpose of forming a capacitor 24 by utilizing the baffleplate 20 as another electrode plate (referred to as a first electrode plate of capacitor 24). The electrode plate 22 (referred to as second electrode plate of capacitor 24) is mechanically fastened to the baffleplate 20 at a plurality of points by using rivets 26. To keep the second electrode plate 22 accurately spaced from and electrically insulated from the first electrode plate 20, an insulating spacer and an insulating collar are used in combination with each rivet.

Figure 2:
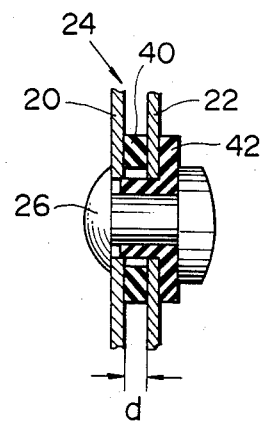
FIG. 2 is a fragmentary enlarged sectional view of the structure for fastening a pair of electrode plates in the liquid quantity sensor of FIG. 1 to each other by using a spacer and a rivet.

Referring to FIG. 2, at each fastening point the first and second electrode plates 20 and 22 are respectively formed with small holes (no numeral) of the same diameter. The holes in the respective electrode plates 20, 22 are brought into alignment, and a ring-shaped insulating spacer 40 is interposed between the two electrode plates 20 and 22 approximately coaxially with the holes in the electrode plates. The inner diameter of the ring-shaped spacer 40 is larger than the diameter of the holes in the electrode plates 20, 22, and the thickness of the spacer 40 corresponds with the intended distance d between the two electrode plates 20 and 22. Then, an insulating collar 42, formed of a hollow cylinder flange at one end, is inserted into the central hole of the spacer 40 through the hole in the second electrode plate 22, and the rivet 26 is inserted into the insulating collar 42 from the side of the first electrode plate 20. In that state the protruding end of the rivet 26 is pressed to form a second head to thereby complete fastening of the second electrode plate 22 to the first electrode plate 20.

Referring again to FIG. 1, another capacitor 34 is provided by fastening an electrode plate 32 to the baffleplate 30 by using the above described rivets 26, insulating spacers 40 and insulating collars 42. The two capacitors 24 and 34 are connected in parallel by using a bus bar 28. The interconnected capacitors 24 and 34 are connected by a lead wire (not shown) to a capacitance measuring device 36 which is located outside of the fuel tank 10; the lead wire extends from the electrode plate 32. For example, the capacitance measuring device 36 has an oscillator circuit which produces a pulse signal having a frequency inversely proportional to the capacitance of a capacitor connected thereto. Thus, the two capacitors 24 and 34, or the two pairs of electrode plates 20, 22, and 30, 32, and the capacitance measuring device 36, provide a liquid quantity sensor to detect the quantity of fuel present in the tank 10 at any moment.

In the liquid quantity sensor of FIG. 1 the total capacitance C of the two capacitors 24 and 34 is given by the following equation.

$$C = E_L(S \cdot x/d) + E_A(S(1-x)/d)$$

where $E_L$ is the dielectric constant of the liquid (fuel 18) in the tank; $E_A$ is the dielectric constant of air; S is the total effective surface areas of the two capacitors 24 and 34; x is a fraction indicative of the submerged portion of the total effective surface area S; and d is the horizontal distance between the two electrode plates of each capacitor 24, 34.

This equation shows that capacitance C is inversely proportional to the distance d between each pair of electrode plates 20 (30) and 22 (32). Therefore, it is important to realize an accurately constant distance d over the entire surface area S of the two capacitors 24, 34 for the purpose of maintaining a definite relation between the quantity or level of the fuel 18 in the tank 10 and the capacitance C. In practice it is suitable to determine the value of the distance d within the range from about 2 mm to about 4 mm, considering that the resolution of the liquid quantity measurement increases as the distance d becomes shorter, that a small value of the distance d is favorable for prevention of intrusion of any foreign solid matter between the pair of electrode plates and that the assembly of the electrode plates becomes troublesome when the distance d is very short.

With a view to realizing the intended distance d in every region of each capacitor 24, 34, the two electrode plates in each capacitor 24, 34 are fastened to each other at a sufficiently large number of points, as illustrated in FIG. 1, by using the parts shown in FIG. 2 at every fastening point, such that the spacers 40 are almost uniformly distributed over the entire area of the second electrode plate 22, 32 of each capacitor 24, 34 and that the distance D between two adjacent rivets 26 or spacers 40 in each capacitor 24, 34 does not exceed 80 mm, as recommended in the above quoted British specification No. 2,089,516A. The distance D is a center-to-center distance.

According to the invention, it is additionally required that the two electrode plates be fastened to each other at every fastening point by applying a compressive load of not smaller than 40 kgf to the insulating spacer 40. Preferably the compressive load on the spacer 40 does not exceed 100 kgf because a greater compressive load sometimes causes cracking of the spacer 40 which is usually formed of a synthetic resin.

Figure 3:
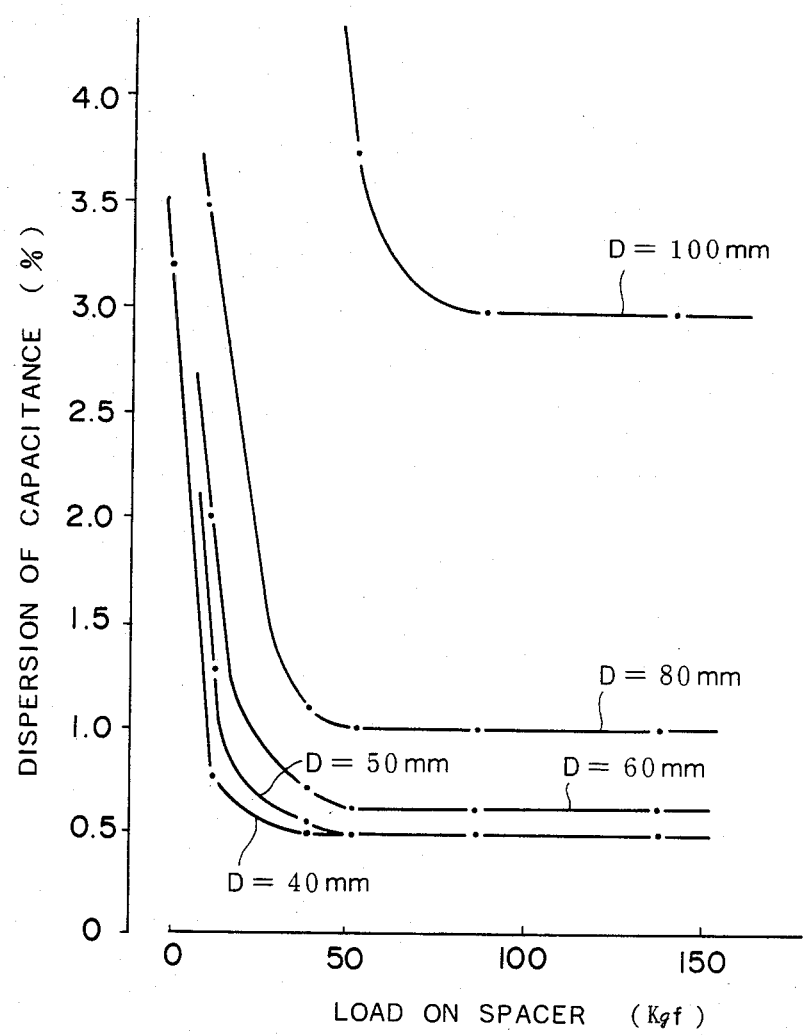
FIG. 3 is a graph showing the result of an experiment indicating the influence of the distance between two adjacent spacers used in a pair of electrode plates of the liquid quantity sensor and the compressive load applied to each spacer for fastening of the two electrode plates to each other on the accuracy of capacitance produced between the two electrode plates.

The applicant carried out an experiment in which a number of capacitors generally of the form shown in FIG. 1 were produced by using the fastening method illustrated in FIG. 2. In the experiment the distance D between two adjacent spacers and the compressive load applied to each were varied. A plated steel plate having a thickness of 4 mm (tolerance of the thickness was ±0.1 mm) was used as the material of the electrode plates. Both the insulating spacers 40 and the insulating collars 42 were formed of polyacetal. Every spacer 40 was 10 mm in outer diameter, 5 mm in inner diameter and 3.0 mm in thickness with tolerance of ±1%. The distance D between two adjacent spacers 40 was varied over the range from 40 to 100 mm, and the compressive load on each spacer 40 was varied over the range from 0 to 140 kgf. All the capacitors produced in the experiment were used to measure capacitance in a vessel containing a suitable amount of liquid fuel. The measurements were used to determine the dispersion of the measured capacitance values for a number of identically produced capacitors. The dispersion provided an indication of the deviation of the distance d between the two electrode plates from an ideal uniformity. FIG. 3 shows the results of the experiment.

The experiment was repeated by changing the material of the electrode plates to a plated steel plate having a thickness of 0.8 mm (the tolerance of thickness was ±0.1 mm), but the results were unchanged from the curves in FIG. 3. The experiment was repeated, but the material of the insulating spacers 40 was changed to different synthetic resins such as polyethylene, nylon and phenolic resin; it was found for this case that the results were again as represented by the curves in FIG. 3. Besides, the outer diameter of the spacer 40 was varied to 12 mm and to 8 mm, but no change was found in the results. Since it is impractical to greatly increase or decrease the outer diameter of the spacer 40 because a decrease in the effective surface area of the electrode plates lowers the mechanical strength of the spacer, it is permissible to conclude from the experimental results that neither the material nor the outer diameter of the spacer 40 affects the accuracy of the capacitance.

Referring to FIG. 3, the results of the above described experiment indicate that the dispersion of the capacitance of the liquid quantity sensors can be rendered fairly small and constant by arranging the insulating spacers 40 in each pair of electrode plates such that the distance D between two adjacent spacers does not exceed 80 mm and, besides, performing the fastening of the two electrode plates to each other with application of a sufficient compressive load on each spacer 40. From a practical point of view, it is sufficient that the dispersion of the capacitance be smaller than about 1%. Accordingly it is preferable that the distance D between two adjacent spacers be from 80 mm to about 50 mm considering that further shortening of the distance D no longer produces a significant improvement on the accuracy of the capacitance despite an increase in the cost as a natural consequence of an increase in the number of the spacers. The experimental results indicate that a compressive load of at least 40 kgf should be applied to each spacer 40 during the fastening of each pair of electrode plates. It is preferable that the compressive load on each spacer be from 40 kgf to about 100 kgf because a greater compressive load does not differ in effect from a smaller compressive load and sometimes causes the spacer to crack.

Of course the embodiment illustrated in FIGS. 1 and 2 is not limiting and can be modified in various respects. For example, a combination of a bolt and a nut may be used instead of the rivet 26. It is also optional to add another pair of electrode plates to the liquid quantity sensor of FIG. 1 or to replace the two pairs of electrode plates 24 and 34 by a pair of relatively wide electrode plates.

What is claimed is:

1. A sensor for detecting the quantity of a liquid in a vessel, the sensor comprising at least one set of electrode plate assembly which comprises:

a first electrode plate substantially vertically disposed in the vessel;

a second electrode plate arranged parallel to and spaced from said first electrode plate such that said first and second electrode plates provide a capacitor;

a plurality of spacers having a generally annular shape and made of electrically insulating synthetic resin material, said spacers being tightly and substantially interposed between said first and second electrode plates in such an arrangement that the distance between each adjacent pair of said spacers is between 50 and 80 mm, each of said spacers having a thickness which corresponds with a predetermined horizontal distance between said first and second electrode plates;

a plurality of fastening means for fastening said second electrode plate to said first electrode plate, said fastening means extending through holes formed in said first and second electrode plates at each location where one of said spacers is interposed between said first and second electrode plates, each of said spacers being subjected to a compressive load between 40 and 100 kgf; and a plurality of insulator collars, each having the shape of a flaged tube, the tubular portion of each of said indulators being inserted in the central hole of one of said spacers interposed between said first and second electrode plates.

2. A liquid quantity sensor according to claim 1, wherein said fastening means is a rivet.

3. The sensor of claim 1 wherein the synthetic resin is selected from the group consisting essentially of polyacetal resin, polyethylene resin, nylon resin and phenolic resin.

4. The sensor of claim 1 wherein the spacing is substantially uniform, the spacing between and load on the spacers being such that the dispersion of capacitance is constant in the range of about 0.5% to 1.2%.

5. The sensor of claim 4 wherein the separation is about 40 mm and the dispersion is about 0.5% over the entire range of spacer loading.

6. The sensor of claim 4 wherein the separation is about 80 mm and the dispersion is about 1.2% over the entire range of spacer loading.

7. The sensor of claim 4 wherein the separation is about 60 mm and the dispersion is about 0.6% over the entire range of spacer loading.

8. A method according to claim 7, wherein said fastening means is a rivet.

9. A method according to claim 7, wherein said fastening means is a combination of a bolt and a nut.

10. A method of producing a liquid quantity sensor having at least one set of a first electrode plate and a second electrode plate arranged parallel to and spaced from each other so as to provide a capacitor, the method comprising the steps of:

interposing a plurality of spacers having a generally annular shape and of an electrically insulating synthetic resin between first and second electrode plates arranged parallel to each other in such an arrangement that the distance between adjacent pairs of said spacers is in the range of 50 to 80 mm, each of said spacers having a thickness corresponding with a predetermined horizontal distance between said first and second electrode plates;

fastening said second electrode plate to said first electrode plate at each location where one of said spacers is interposed between said first and second electrode plates by inserting a fastening means through holes formed in said first and second electrode plates and tightening said fastening means such that each of said spacers is subjected to a compressive load between 40 and 100 kgf; and inserting an insulator having the shape of a flanged tube into the central hole of one of said spacers prior to tightening of said fastening means.

11. The method of claim 10 wherein the synthetic resin is selected from the group consisting essentially of polyacetal resin, polyethleyne resin, nylon resin and phenolic resin.

12. The method of claim 10 wherein the spacing is substantially uniform, the spacing between and load on the spacers being such that the dispersion of capacitance is constant in the range of about 0.5% to 1.2%.

13. The method of claim 10 wherein the separation is about 40 mm and the dispersion is about 0.5% over the entire range of spacer loading.

14. The method of claim 10 wherein the separation is about 80 mm and the dispersion is about 1.2% over the entire range of spacer loading.

15. The method of claim 10 wherein the separation is about 60 mm and the dispersion is about 0.6% over the entire range of spacer loading.

16. A set of sensors, each sensor being provided for capacitively detecting the quantity of liquid in a vessel and including at least one electrode plate assembly, the sensors being identically produced so as to have a dispersion of measured capacitor values no greater than about 1.2% for identical depths of the liquid in a vessel, each electrode plate assembly of the set of sensors comprising:

a first electrode plate substantially vertically disposed in the vessel;

a second electrode plate arranged parallel to and spaced from said first electrode plate such that said first and second electrode plates provided a capacitor;

a plurality of spacers having a generally annular shape and made of electrically insulating synthetic resin material, said spacers being tightly and substantially interposed between said first and second electrode plates in such an arrangement that the distance between each adjacent pair of said spacers is between 50 and 80 mm, each of said spacers having a thickness which corresponds with a predetermined horizontal distance between said first and second electrode plates;

a plurality of fastening means for fastening said second electrode plate to said first electrode plate, said fastening means extending through holes formed in said first and second electrode plates at each location where one of said spacers is interposed between said first and second electrode plates, each of said spacers being subjected to a compressive load between 40 and 100 kgf; and a plurality of insulator collars, each having the shape of a flaged tube, the tubular portion of each of said insulators being inserted in the central hole of one of said spacers interposed between said first and second electrode plates.

17. The set of sensors of claim 16 wherein the spacing is substantially uniform, the spacing between and load on the spacers being such that the dispersion of capacitance is constant in the range of about 0.5% to 1.2%.

18. The set of sensors of claim 17 wherein the separation is about 40 mm and the dispersion is about 0.5% over the entire range of spacer loading.

19. The set of sensors of claim 17 wherein the separation is about 80 mm and the dispersion is about 1.2% over the entire range of spacer loading.

20. A method of producing a set of capacitive liquid level sensors wherein each sensor of the set is identically produced and includes a first electrode plate and a second electrode plate arranged parallel to and spaced from each other so as to provide a capacitor, the sensors of the set being produced so that when they are used to sensor liquid level they have a dispersion of measured capacitor values no greater than about 1.2% for identical depths of the liquid in a vessel, each sensor of the set being produced by the steps comprising:

interposing a plurality of spacers having a generally annular shape and of an electrically insulating synthetic resin between first and second electrode plates arranged parallel to each other in such an arrangement that the distance between adjacent pairs of said spacers is in the range of 50 to 80 mm, each of said spacers having a thickness corresponding with a predetermined horizontal distance between said first and second electrode plates;

fastening said second electrode plate to said first electrode plate at each location where one of said spacers is interposed between said first and second electrode plates by inserting a fastening means through holes formed in said first and second electrode plates and tightening said fastening means such that each of said spacers is subjected to a compressive load between 40 and 100 kgf; and inserting an insulator having the shape of a flanged tube into the central hole of one of said spacers prior to tightening of said fastening means.

21. The method of claim 20 wherein the spacing is substantially uniform, the spacing between and load on the spacers being such that the dispersion of capacitance is constant in the range of about 0.5% to 1.2%.

22. The method of claim 20 wherein the separation is about 40 mm and the dispersion is about 0.5% over the entire range of spacer loading.

23. The method of claim 20 wherein the separation is about 80 mm and the dispersion is about 1.2% over the entire range of spacer loading.

* * * * *